US006112053A

United States Patent [19]

Dunki-Jacobs et al.

[11] Patent Number: 6,112,053

[45] Date of Patent: Aug. 29, 2000

[54] TELEVISION VIEWERSHIP MONITORING SYSTEM EMPLOYING AUDIO CHANNEL AND SYNCHRONIZATION INFORMATION

[75] Inventors: Robert John Dunki-Jacobs, Ballston Lake; Michael Robert Hopple, Schenectady, both of N.Y.

[73] Assignee: General Electric Company, Schenectady, N.Y.

[21] Appl. No.: 08/892,033

[22] Filed: Jul. 14, 1997

[51] Int. Cl.$^7$ .................... H04H 1/00; H04N 7/10

[52] U.S. Cl. .................... 455/2; 348/4; 455/6.3

[58] Field of Search .................... 455/2, 6.1, 6.2, 455/6.3; 348/1, 2, 6, 10, 907, 4

[56] References Cited

U.S. PATENT DOCUMENTS

| | | | |
|---|---|---|---|
| 4,230,990 | 10/1980 | Lert, Jr. et al. | 455/67 |
| 4,355,372 | 10/1982 | Johnson et al. | 364/900 |
| 4,546,382 | 10/1985 | McKenna et al. | 358/84 |
| 4,566,030 | 1/1986 | Nickerson et al. | 358/84 |
| 4,567,511 | 1/1986 | Smith et al. | 358/84 |
| 4,718,106 | 1/1988 | Weinblatt | 455/2 |
| 4,816,904 | 3/1989 | McKenna et al. | 358/84 |
| 4,905,080 | 2/1990 | Watanabe et al. | 358/84 |
| 4,930,011 | 5/1990 | Kiewit | 358/84 |
| 4,945,412 | 7/1990 | Kramer | 358/142 |
| 4,955,070 | 9/1990 | Welsh et al. | 455/2 |
| 5,294,981 | 3/1994 | Yazolino et al. | 348/4 |
| 5,382,970 | 1/1995 | Kiefl | 348/1 |
| 5,408,258 | 4/1995 | Kolessar | 348/5.5 |
| 5,436,653 | 7/1995 | Ellis et al. | 348/2 |

*Primary Examiner*—John W. Miller
*Attorney, Agent, or Firm*—Jill M. Breedlove; Douglas E. Stoner

[57] ABSTRACT

The present invention provides an system, apparatus, and method of recording a viewer's television viewership habits. Sensors passively monitor the audio signal and video signal emanating from the television. By matching the audio signal in the source and emanating from the television and by matching television frame synchronization signal and the television source synchronization signal an unambiguous identification of the viewed channel is made.

18 Claims, 3 Drawing Sheets

TELEVISION VIEWERSHIP MONITORING SYSTEM EMPLOYING AUDIO CHANNEL AND SYNCHRONIZATION INFORMATION

BACKGROUND OF THE INVENTION

This invention relates to an apparatus, system, and method for monitoring and collecting data on the viewing habits of television viewers. More specifically this invention relates to an apparatus, system, and method for monitoring and collecting data on the viewing habits of television viewers employing audio channel information, synchronization information, and having adaptive installation capability.

Previous attempts to measure viewership patterns have employed intrusive measurement techniques (i.e. physical modification of the television receiver) relying on inferential measurement (i.e. measuring radio frequency local oscillator frequency), and priori encoding tags (i.e. in audible audio patterns or video codes) inserted at the program origination point. This invention uses unilateral measurement of the natural program content in a non-invasive, direct observation method to determine viewership preferences.

It is desirable to provide a remote, non intrusive and accurate system for providing accurate details of television viewership.

SUMMARY OF THE INVENTION

The present invention addresses the foregoing needs by providing an electronic television viewership monitoring system composed of a coincidence processor and a digital processor which monitors the audio output of the television receiver via a magnetic sensor and compares the audio output signal sequentially to the locally detectable broadcast or cable television program sources to identify the channel being viewed. This system next stores the viewership information and periodically reports the identified channel via a telephone link to a central computer. Sensors also passively monitor the video synchronization signal s emanating via electro-magnetic radiation from the television and are used to improve the efficiency of the audio signal comparison process.

The coincidence processor makes an unambiguous identification of the viewed channel based on the audio signal and the video synchronization signal from the television. During prolonged audio silence the coincidence processor makes an identification of the viewed channel based on the matching of a video synchronization signal from the television program signal and a video synchronization signal from the television receiver. When the television program signal is scrambled, the coincidence processor makes an identification based on audio matching only.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
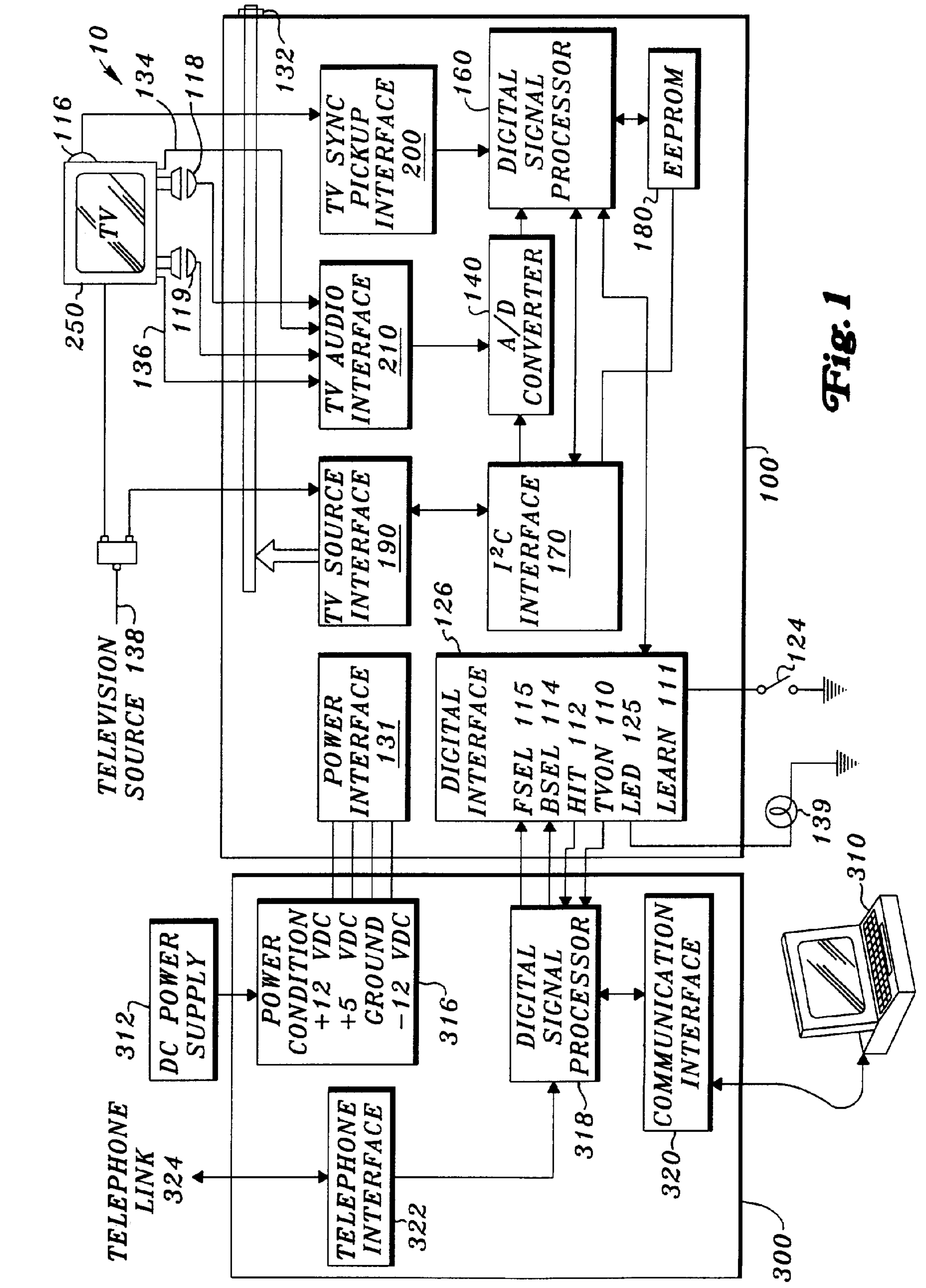
FIG. 1 is a system block diagram of the present invention.

This invention provides audio and video signal matching to produce accurate details of television viewership. A television audience measurement system 10 in accordance with the present invention comprises a coincidence processor 100, a video sync pickup 116, and a first audio output pickup 118 as illustrated in FIG. 1. A digital processor 300 is coupled to coincidence processor 100. Coincidence processor 100 is adapted to determine when television 250 is operating and also is adapted to determine the tuned TV signal of television 250. This information is communicated to digital processor 300 which stores the data and periodically communicates this data to a central computer (not shown), for example over telephone line 324.

Pickups 116 and 118 passively monitor the video synchronization portion and audio output portion of signals emanating from television 250. Signal processing is used to identify the audio signal portion and the video sync signal portion from television 250. Coincidence processor 100 then makes an unambiguous identification of the viewed channel based on the signal processing results.

One embodiment of coincidence processor 100 as depicted in FIG. 1 by way of example and not limitation comprises: power interface 131; television source interface 190; TV audio interface 210; TV sync pickup interface 200; digital interface 126; $I^2C$ interface 170; analog to digital (A/D) converter 140; micro processor 160; and EEPROM 180. The function of each of these components is discussed below.

FIG. 1 illustrates TV audio interface 210 coupled to AND converter 140 and also coupled to television 250 via a first and a second audio pickup 118 and 119 respectively. Alternatively, a first and a second television audio line output 134 and 136 respectively are coupled to TV audio interface 210. Audio pickups 118 and 119 typically comprise magnetic pickups which convert the magnetic field flux generated by television 250 speakers into electrical energy. Alternatively, audio pickups 134 and 136 are, for example, line level audio detectors which are coupled directly to television 250 audio outputs (not shown) and measure the audio output of television 250 directly.

Figure 2:
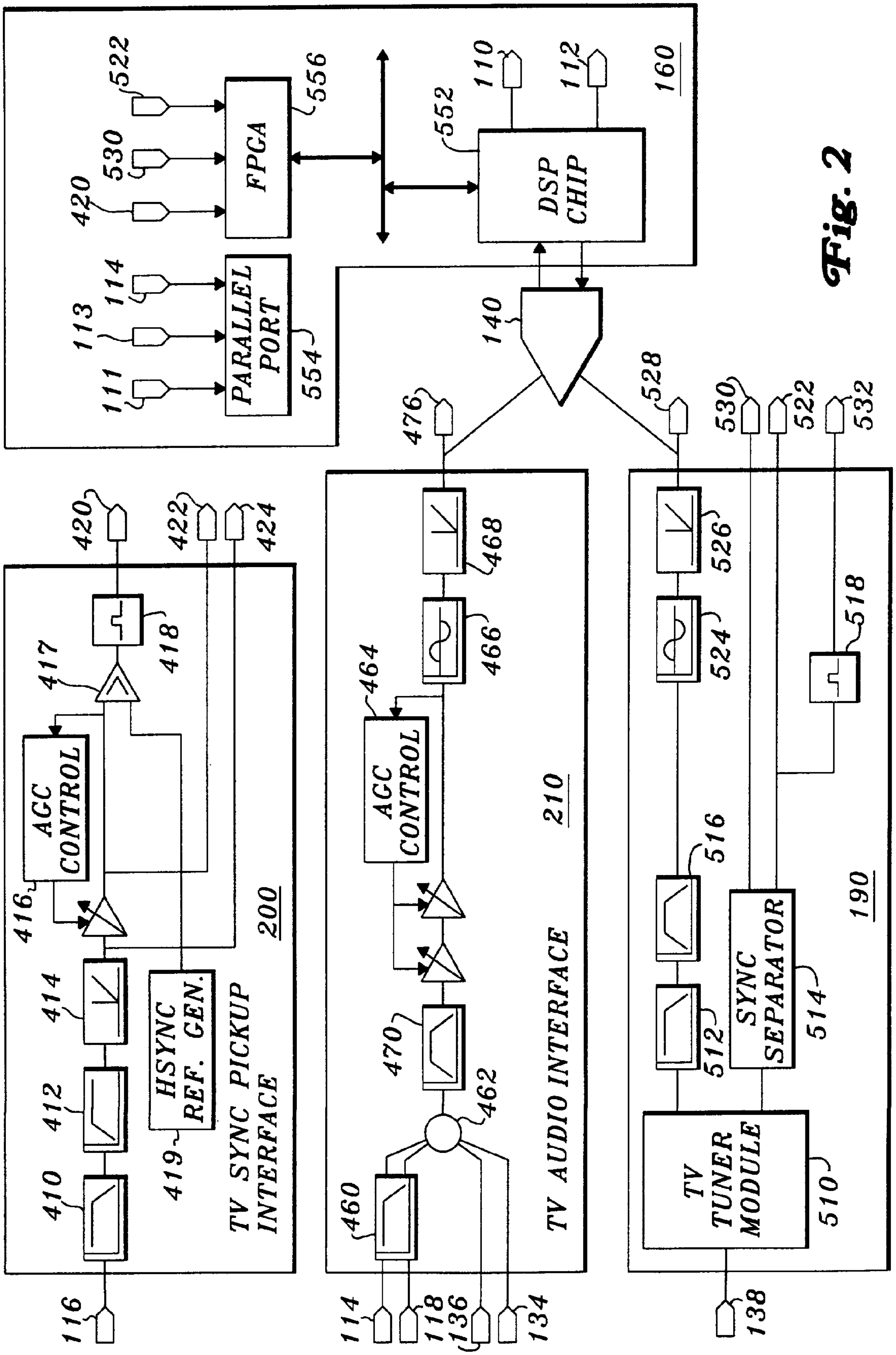
FIG. 2 is a functional block diagram of the coincidence processor.

TV audio interface 210 is further illustrated in FIG. 2. The function of TV audio interface 210 is to amplify and filter the audio portion of the TV station signal emanating from television 250 via audio pickups 118 and 119 or audio line outputs 134 and 136 respectively. Audio pickup signals are filtered by a low pass filter 460 to remove any contamination from non audio electro-magnetic radiation emanating from the television receiver. For example, low pass filter 460 is a single pole filter having a pole at about 1,000 hertz. Audio signal source from line level output 134 or 136 do not pass through a low pass filter because the signal content is an accurate representation of the television's audio signal not being subjected to unwanted audio electro-magnetic radiation. Next, the above mentioned input audio signals are coupled to a summer 462 where they are added together. The output of summer 462 is coupled to a band pass filter 470. For example, band pass filter 470 is a second order filter with break frequencies at about 60 hertz and 1,000 hertz. The function of band pass filter 470 is to minimize frequencies below 60 hertz and above 1,000 hertz to insure that only program audio content is subsequently processed. The audio signal output of band pass filter 470 (FIG. 2) is re-scaled by an automatic gain control (AGC) 464. AGC 464 adjusts the audio signal amplitude so as to be highly independent of the volume control setting on television 250 and to be balanced between first audio pickup 118 and second audio pickup 120 without regard to sensor sensitivity. As the volume control on television 250 or any of the aforementioned sources of audio volume variability is varied, AGC 464 maintains a fixed peak audio signal output level. The output of AGC 464 is shifted by a shifter 466 and limited by a limiter 468. The shifting and limiting is to scale and adjust the audio signal to get maximum resolution and accuracy from A/D converter 140. Input low pass filter 460 and the low pass portion of the bandpass filter 470 minimize aliasing of TV audio signal 476 and RF audio signal 428 by A/D 140.

Sync pickup 116 (FIG. 1) is a magnetic pickup utilized in this invention to allow interception of magnetic flux from the retrace circuits that are typically located near the rear of television 250. Sync pickup 116 is coupled to TV video sync pickup interface 200. TV video sync pickup interface 200 generates a digital signal which is representative of the video retrace signal timing.

TV video sync pickup interface 200 is further illustrated in FIG. 2. TV video sync pickup 200 detects the video synchronization signal emanating from television 250 and provides a representation of this sync signal. The TV video sync signal may be, for example, the horizontal sync signal. Alternatively, the TV video sync signal is the vertical sync signal. TV video sync pickup interface 200, by way of illustration and not limitation, comprises: a low pass filter 410; a high pass filter 412; a level limiter 414; a n automatic gain control (AGC) 416; a comparator 417; and a one-shot gate 418. Sync pickup 116 is coupled to low pass filter 410. This filter has a pole at about 30,000 hertz. Low pass filter 410 is coupled to high pass filter 412. High pass filter 412 has a pole at about 50,000 hertz. The net effect of these two filters is allow video sync signal frequencies within about 30,000 to about 50,000 hertz to pass to level limiter 414. The signal from the output of level limiter 414 is applied to the input of an automatic gain control (AGC) amplifier 416 which provides from about −6 to about 40 dB of gain. The time constant of the AGC control loop is approximately 3 seconds. A first output of AGC 416 is then applied to a first input of comparator 417. A second output of AGC 416, labeled "RFHSYNC" 422 in FIG. 2, is coupled to micro processor 160 so that the output signal of AGC 416 passes to micro processor 160. A horizontal sync reference generator 419 is coupled to a second input of comparator 417. The output of comparator 417 is coupled to a one-shot gate 418. One-shot gage 418 is coupled to micro processor 160 so that the output signal of comparator 417 passes to micro processor 160. When a video sync signal is detected comparator 417 generates a signal that causes the one-shot gate 418 to generate a fixed duration signal "RFSYNC1" 420. For example, one-shot output signal "RFSYNC1" is a thirty micro-second signal that is triggered by the horizontal sync signal detected in television 250.

Power Interface 131 provides power to coincidence processor 100. Power Interface 131 (FIG. 1) is powered by digital processor 300. Alternatively, power interface 131 is powered directly by an external power supply (not shown). Power interface 131 filters noise from the power source and provides ground isolation to assure proper operation of coincidence processor 100. Power for digital processor 300 and coincidence processor 100 is provided by, for example, a wall mount or table top packaged DC power supply 312.

Digital processor 300 (FIG. 1) comprises power conditioning interface 316, micro processor 318, communications interface 320, and telephone interface 322. Because digital processor 300 is part of the prior art and performs only database maintenance and control of the scan order a detailed discussion of its operation will not be presented.

Coincidence processor 100 (FIG. 1) and digital processor 300 each comprise micro processors 160 and 318 respectively which establish communication therebetween. Digital interface 111 on coincidence processor 100 transmits and receives digital information between digital processor 300 and coincidence processor 100. Digital bus 114 and Digital bus 115, located on digital interface 126 are controlled by micro processor 318 to communicate the desired channel and control data to coincidence processor 100. A "HIT" signal 112 and a "TVON" signal 110 communicate television 250 status to micro processor 160. "TVON" signal 1 10 is generated when coincidence processor 100 detects a horizontal or vertical video sync signal from video sync pickup 116. "HIT" signal 112 is generated when coincidence processor 100 determines that the pre-selected demodulated channel of TV tuner module 510 (FIG. 2) matches the channel to which television 250 is tuned as is discussed below. An indication 139 is generated to identify when a video sync signal is detected by coincidence processor 100. For example the indication is an LED 139 that is driven by LED output 125 on digital interface 111.

A central computer (not shown) collects data from TV audience monitor system 10, preferably a plurality of TV audience monitor systems 10, for determining viewership habits of several families. TV monitor system 10 communicates to the central computer periodically. By way of example and not limitation communication by TV monitor system 10 occurs via telephone line 324. Digital processor 300 senses a remote phone going off hook at any time during communications activity via telephone interface 322 and appropriately interrupts communication of TV monitor system 10 with the central database. A computer 310 is coupled to the micro processor 318 via a communications interface 320 on digital processor 300.

It is necessary to program coincidence processor 100 with each channel of the television station transmission frequencies so coincidence processor 100 can store channel match signal status, "TVON" status, and data representing the television source transmission frequencies—i.e., information used to calculate the channel match signal status. A television source 138 is the a cable TV signal coupled to TV monitor system 10. Alternatively, the television source 138 is a broadcast television signal which is coupled to TV monitor system 10. These data are used when coincidence processor 100 executes its matching function. Programming ("Learning") must occur before coincidence processor 100 can begin monitoring television 250. By way of example and not limitation television sourcel 38 is disconnected and a standard radio frequency (RF) source is connected in its place which provides a steady single frequency audio tone (e.g. 400 Hz) and a black video frame on a channel so as to avoid unwanted signals on television 250 during the television source programming stage. Sync pickup 116 is then attached to the rear of the television near the video sync trace circuits. Sync pickup 116 is also coupled to TV sync pickup interface 200 on coincidence processor 100. While a LEARN switch 124 is closed, digital interface 126 is ignored and the micro processor 160 analyzes the audio and horizontal or vertical video sync signals to determine audio and synchronization characteristics critical to the proper operation of the TV audience measurement system 10. After a period of time, for example forty-five seconds, LEARN switch 124 is opened and micro processor 160 stores the data representing television receiver's operational characteristics in EEPROM 180 for use after subsequent power on initialization. EEPROM 180, for example, is non volatile memory. The stored data enable micro processor 160 to determine each television station's unique transmission frequency and the time delay between television source 138 signal and the monitored signal on television 250. After the learn cycle is complete the television source 138 connection is restored.

A test interface 132 (FIG. 1) is provided for manufacturing test. It provides analog and digital signals from television source interface 190, TV audio interface 210, and TV sync pickup interface 200.

Digital signal processor 160 is coupled to A/D converter 140, $I^2C$ interface 170, EEPROM 180, and TV sync pickup interface 200, as illustrated in FIG. 1. Digital signal processor 160 processes digital data input and determines when a match of the television 250 audio output occurs as is further discussed below.

Digital processor 160 is coupled to parallel port 554 and field programmable data array (FPGA) 556 as is illustrated in FIG. 2. Parallel port 554 couples the "Learn" status and data from digital buses FSEL 115 and BSEL 114 to the DSP chip 552. The core of micro processor 160 comprises clock generation, power on reset, "Learn" I/O and decoding circuits required for operation of coincidence processor 100. A timer and interrupt structure is used to interface to other elements of coincidence processor 100.

EEPROM 180 (FIG. 1) is coupled to micro processor 160 and stores configuration data necessary for operation of this system. For example, the time delay between the program audio source and the audio signal at TV audio signal 476 determined during the Learn mode is stored here.

$I^2C$ interface 170 shown in FIG. 1 is used to control TV tuner module 510. TV tuner module 510 is, for example, a Philips® tuner module F1236, or the like. $I^2C$ interface 170 is also used to access EEPROM 180.

Television source interface 190 is further illustrated in FIG. 2. Television source interface 190 shown in FIG. 2, comprises a TV tuner module 510 for RF input demodulation, a low pass filter 512, a band pass filter 516, a shifter 524, a limiter 526, a sync separator 514, and a one-shot gate 518. Low pass filter 512 has a pole at about 1000 Hertz to minimize unwanted low frequency signals produced by TV tuner module 510. Band pass filter 516 has corner frequencies at 60 Hertz and 1000 Hertz. The "RF audio" signal output of band pass filter 516 is shifted by shifter 524 and limited by limiter 526. The resulting signal is "RF audio" signal 528. "RF audio" signal 528 is coupled to A/D 140. A composite video output signal from TV tuner module 510 is coupled to sync separator 514. Sync separator 514 recovers the vertical and horizontal video sync signals from the base-band composite video output of TV tuner module 510. Mono-stable one-shot gate 518 is coupled to the output of sync separator 514 to produce a fixed duration signal "VBLANK" 532, which is active during most of television 250 vertical retrace time. For example, the output of one-shot gate 518 may be thirty micro-seconds in duration. "VBLANK" 532 is read into micro processor 160 via VSYNC signal 522. When "VBLANK" 532 is true, micro processor 160 delays for a fixed period of time and subsequently makes a set of sample readings of "TV" signal 476 and "RF audio" signal 528 for comparison.

A/D converter 140 is illustrated in FIG. 2. A/D converter 140 performs a 12 bit conversion of "TV" signal 476 and RF Audio signal 528 which is generated from TV audio interface 210 and Television source interface 190. The conversion rate of A/D 140 is, for example, sixty-four thousand cycles per second, which allows micro processor 160 to over sample "TV" signal 476 and "RF audio" signal 528 by a factor of two, providing an equivalent thirteen bit resolution. Total system dynamic range is therefore about one hundred fifty eight dB (eighty dB from "TV" signal 476 and "RF audio" signal 528 and six dB multiplied by thirteen from A/D 140).

Figure 3:
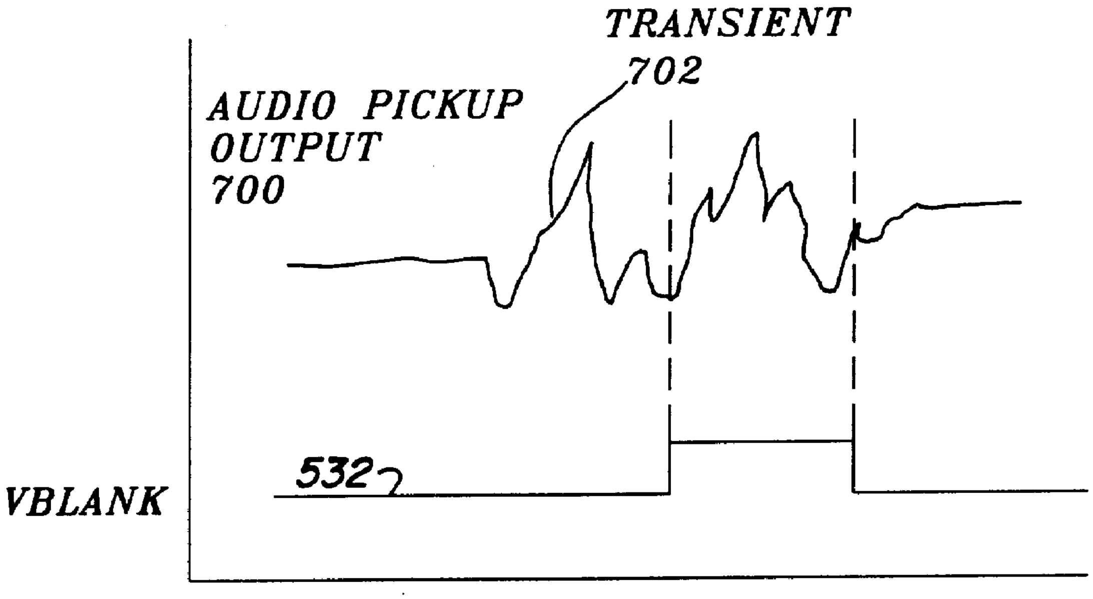
FIG. 3 is a graphical illustration of the synchronization of buffer samples of the magnetic pickup voltage and the program audio vertical sync pulse from the radio frequency tuner and sync separator.

Coincidence processor 100 (FIG. 1) determines whether a channel match has been found between the metered TV signal and the tuned channel on television 250 based on video matching and audio matching. An audio match is determined by taking a sample audio signal from television 250 represented by "TV" 476 (FIG. 2) and "RF audio" 528, and cross-correlating the two signals in micro processor 160. About 128 samples are stored from each signal of the wave form which has been synchronized with the vertical video sync as shown in FIG. 3. There is also a transient 709 in the "TV" signal 700 which occurs during and after VBLANK 532. This transient, as illustrated by transient 709 in FIG. 3, appears in audio pickup inputs 118 and 119 and is caused by the video sync signal from the TV being magnetically coupled into the audio pickup. Synchronization of the buffer acquisition with the vertical video sync timing is preferred because the video sync induced transient will not corrupt the cross-correlation process. Using VSYNC signal 522 to reduce the gain of low pass filter 460 during the transient 709 improves the efficacy of AGC 464.

Prior to cross-correlation of "RF audio" 476 signal and "TV audio" signal 528, each signal undergoes digital DC content removal and normalization to assure that the digital data is the most numerically accurate so as to provide a more accurate cross-correlation. For example, normalization may be limited to within a region where AGC 416 and AGC 464 gain is not more than 24 dB to assure that system noise is not amplified to the point where the cross-correlation results are jeopardized.

The following equations may be used to determine audio match:

$$\bar{x} -= \frac{1}{k}\sum_{i=0}^{n} x_i \qquad \text{equation 1}$$

wherein "$\bar{x}$" represents the average value of television source audio signal, "k" represents an integer, and "n" represents the number of samples;

$$X_i = S(x_i - \bar{x}) \qquad \text{equation 2}$$

wherein "$X_i$", represents the normalized value of "$x_i$", "$\bar{x}$" represents the average (DC) value of "x" , and "S" is a normalization factor of {1,2,4,8,16};

$$\bar{y} = \frac{1}{k}\sum_{i=0}^{n} y_i \qquad \text{equation 3}$$

wherein "$\bar{y}$" represents the normalized value of the "TV" signal, "k" represents an integer, and "n" represents the number of samples;

$$Y_i = S(y_i - \bar{y}) \qquad \text{equation 4}$$

wherein "$Y_i$" represents the normalized value of "$y_i$", "$\bar{y}$" represents the average (DC) value of "y", and "S" is a normalization factor of {1,2,4,8,16};

$$C_j = \frac{\sum_{i=0}^{n} Y_i^2 - \sum_{i=0}^{n} X_i^2}{\left(\sum_{i=0}^{n} X_i Y_i\right)^2} \qquad \text{equation 5}$$

wherein "$C_j$" represents the cross-correlation of "$X_i$", to "$Y_i$", "n" represents the number of samples, "j" represents the number of cross-correlations;

$$G_j = f(C_j) \qquad \text{equation 6}$$

wherein "$G_j$" represents a non-linear mapping function of the correlation result "$C_j$" and $$A = \sum_{j=0}^{n} G_j \qquad \text{equation 7}$$

wherein "A" is the summation of "n+1" "$G_j$" values and "n" is the number of correlation results taken.

Equations 1 and 3, shown above, mathematically illustrate how each audio signal is normalized. First the average value is calculated. This value is determined using the sample size as the numerator represented by the variable "k". Signal normalization is required for cross-correlation. As such the average value is subtracted from each data point as is illustrated in equations 2 and 4. In these equations "$X_i$" represents "TV audio" signal 476 and "$Y_i$" represents "TV" signal 528. "$X_i$" and "$Y_i$" are then cross-correlated as is illustrated in equation 5. Cross-correlation is implemented to provide a mathematical representation of how closely matched "$X_i$"and "$Y_i$" are.

After cross-correlation, as shown in equation 5, a non linear mapping function represented by equation 6 is used to produce a "goodness" value "G." Several "G" values are summed based on the number of samples measured by the analog to digital converter, as shown in equation 7, where the resultant is value A. For example, one-hundred-twenty-eight samples are taken for each "G" value calculation. The value is passed through a dead-band threshold detector for final match determination. The dead-band threshold detector sets a flag if "A" is above a upper limit value and resets the flag if "A" is less than a lower limit value. For example, if the set upper limit is binary number one-thousand and the set lower limit is binary number six-hundred then successive "A" values of four-hundred, twelve-hundred, eight-hundred, eleven-hundred, and five-hundred-eighty will result in the flag being set on the second sample and reset on the fifth sample.

The final audio match is determined by a logical median filter. The logical median filter signals that a match has occurred if the flag set by the dead-band threshold detector is "true" a predetermined number of times within a range of opportunities. When a match is detected, an audio match signal is set to "true". For example, the audio match signal is set true when the dead-band threshold flag has been true two of the last three opportunities.

Immediately following the command to change to a new channel is received via FSEL signal 115 and BSEL signal 114, the number of dead-band sets within a range required to register a audio match is increased to guard against false positive matches. For example, the number of dead-band sets within a range of three is two and when a channel change command is received the number of dead-band sets is increased to three in a range of three.

Video matching provides another check, as with audio matching, to determine whether a viewed television channel has been determined. Video matching is performed in micro processor 160 as described above. By checking alignment of the horizontal video sync signal from television 250, RFH-SYNC 422, and the horizontal video sync from the sync separator, RFSYNC2 530, video frame matching is accomplished. Matching for horizontal video sync occurs infrequently (about once per second) and is triggered by the trailing edge of RFSYNC1 420. A number of consecutive horizontal video sync pairs are timed and averaged. This delay is compared to the known matched delay and known jitter of a specific TV receiver determined during LEARN operation and recovered from EEPROM 180 during initialization. A TV signal is any channel represented by television source 138. If the delay is within a band defined by a fixed number of standard deviations from the average RF television signal delay, for example, three standard deviations, a video match has been determined.

The establishment of a channel match condition and maintenance of the match is a heuristic process that is determined by both the audio match process and the video match process. Table 1 below illustrates the decision process. When neither the audio match signal nor the video match signal indicates that there is a channel match then coincidence processor 100 indicates that there is no channel match by resetting "HIT" signal 112. If either the video match signal or the audio match signal indicates that there is a match then coincidence processor 100 indicates that a match has occurred by setting "HIT" signal 112 to "true". As such, use of the phrase "the video match signal or the audio match" as identified in this Specification means either a true video match signal or a true audio match signal results in a positive channel match. The "Conditional" entries in Table 1 are intended to allow various heuristic algorithms to be used when only one match signal is present at any given instant. One set of heuristics that enables the setting "HIT" signal 112 true is the case where a video match would generate a video match for a period of time such that verification by the slower audio matching process could take place allowing earlier detection of the match condition. Another heuristic might allow a HIT to be declared if there is an audio match and the reason for the negative result on the video match was determined to be the presence of a sync pulse scrambled broadcast from the program source. Table 1 is but one example of the match decision matrix, other combinations will also provide a channel match decision matrix. For example, in another embodiment of the present invention both the video match signal and the audio match signal must be true for a positive channel match to occur.

TABLE 1

Channel Match Decision Matrix

| Channel Match | Audio Match | No Audio Match |
|---|---|---|
| Video Match | True | Conditional |
| No Video Match | Conditional | False |

Table 2 below indicates the action to be taken at the given time period. The process starts when a channel selection code is received from digital processor 300 s FSEL signal 115 and BSEL 114 buses at time zero. Next, the channel selection code from digital processor 300 is decoded by micro processor 160. Next, a video match check is made. If there is no match then the wrong channel has been selected, thus another channel is selected. Once a positive video match is determined the channel selector remains tuned to the selected channel until there is no video or audio match as indicated in the table below. For one median filter implementation, if any previous two matches were true then "HIT" signal 112 is set true. "HIT" signal 112 is set false if there is no match at the next match check. If no audio match is true for forty-five seconds after the audio match was true then digital processor 300 selects another channel and starts the process over. The time periods listed in Table 2 represent one example of time periods used in the above described process.

TABLE 2

Channel Match Process

| Time (sec) | Action taken |
|---|---|
| 0 | Command from digital processor decoded. |
| 1 | Video match check, if no video match then wrong channel. |
| 2 | Audio match check, if no audio match then wrong channel. |
| 3 | Video match check, if no video match then wrong channel. If this or previous two checks were positive, then set "HIT" signal 112 true. |
| 4–25 | Check audio match each second, if audio match ever fails, then set "HIT" signal 112 false. If no video match occurs during this time, set "HIT" signal 112 false. |
| >25 | Check video match signal each second, if video match ever fails, then set "HIT" signal 112 false. If no audio match in last 45 seconds, then select another channel. |

During channel matching, the audio match algorithm is executed continuously and the video matching algorithm is executed at a predetermined rate, for example, every second. As such, a channel match check is recorded every second. As a result, an update is available potentially every second for eventual transmission to for example a central computer.

It will be apparent to those skilled in the art that, while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A system for determining the channel of a TV signal to which a television is tuned when said television is in operation, said TV signal comprising a video signal portion and an audio signal portion, the system comprising:

a coincidence processor adapted to generate a channel match signal in response to a match between said video signal portion of said TV signal and a video sync signal of said television and also in response to a match between said audio signal portion of said TV signal and an audio output signal from said television, said coincidence processor generating said channel match signal without requiring insertion of an identifier signal into the TV signal broadcast.

2. The system of claim 1 wherein said video sync signal is adjusted to compensate for signal propagation delay caused by said television and said TV measurement system.

3. The system of claim 2 wherein said coincidence processor further is coupled to a video sync pickup disposed adjacent to said television so as to detect video sync signals emitted from said television.

4. The system of claim 2 wherein said coincidence processor is further adapted to generate said channel match signal when a channel match has occurred and to reset said channel match signal at a predetermined time when said channel match has not recurred within a predetermined time.

5. The system of claim 4 wherein said coincidence processor further is coupled to at least one audio output of said television.

6. The system of claim 5 wherein said coincidence processor is further adapted to generate an indication when a TV signal is detected.

7. The system of claim 6 wherein said coincidence processor further comprises:

a television source interface coupled to said TV signal and to an $I^2C$ interface wherein said television source interface is adapted to couple data from said TV signal to said $I^2C$ interface;

a micro processor coupled to said $I^2C$ interface;

a non volatile memory coupled to said $I^2C$ interface;

a TV video sync pickup interface coupled to said micro processor wherein said TV video sync pickup interface is adapted to process signals from said video sync pickup so as to be compatible with said micro processor;

an analog to digital converter coupled to said $I^2C$ interface;

a TV audio interface coupled to said at least one audio output and coupled to said analog to digital converter wherein said TV audio interface processes signals from said at least one audio output so as to be compatible with said analog to digital converter;

said analog to digital converter coupled to said micro processor wherein said analog to digital converter converts said TV audio interface output and said $I^2C$ interface output to a digital format;

a digital interface coupled to said micro processor wherein said digital interface couples channel selection data to said micro processor and said digital signal interface couples the channel match signal status and the "TVON" status to said digital processor; and said non volatile memory coupled to said micro processor wherein said non volatile memory stores said channel match signal status, said "TVON" status, and data used to calculate said channel match signal status and said "TVON" status.

8. The system of claim 7 wherein said TV video sync pickup interface further comprises means for sensing a sync signal from a television and correspondingly generating a "RFSYNC1" signal wherein said "RFSYNC1" signal is a pulse representative of said sync signal.

9. The system of claim 8 wherein said TV audio interface further comprises means for sensing an audio signal from said television and correspondingly generating a "TV audio" signal wherein said "TV audio" signal is an analog signal representative of said audio signal from said television.

10. The system of claim 9 wherein said $I^2C$ interface further comprises:

means for generating an "RFSYNC2" signal wherein said "RFSYNC2" signal is separated from a composite video signal generated by a TV tuner module; and means for generating an "VBLANK" signal wherein said "VBLANK" signal is separated from a composite video signal generated by said TV tuner module.

11. The system of claim 10 wherein said television source interface is further coupled to a test interface wherein said test interface is adapted to transmit signal data from said television source interface to an external apparatus.

12. The system of claim 1 wherein said coincidence processor is adapted to generate a channel match signal in each of three conditions:

the presence of a video match between said video signal portion of said TV signal and a video sync signal of said television;

the presence of an audio match between said audio signal portion of said TV signal and at least one audio output signal from said television; and the presence of a video match between said video signal portion of said TV signal and a video sync signal of said television, and an audio match between said audio signal portion of said TV signal and said at least one audio output signal from said television.

13. The system of claim 12 wherein said coincidence processor comprises:

a television source interface coupled to said TV signal and to an $I^2C$ interface wherein said television source interface is adapted to couple data from said TV signal to said $I^2C$ interface;

a micro processor coupled to said $I^2C$ interface;

a non volatile memory coupled to said $I^2C$ interface;

a TV video sync pickup interface coupled to said micro processor wherein said TV video sync pickup interface is adapted to process signals from said video sync pickup so as to be compatible with said micro processor;

an analog to digital converter coupled to said $I^2C$ interface;

a TV audio interface coupled to said at least one audio output and coupled to said analog to digital converter wherein said TV audio interface processes signals from said at least one audio output so as to be compatible with said analog to digital converter;

a digital interface coupled to said micro processor wherein said digital interface couples channel selection data to said micro processor and said digital interface couples the channel match signal status and the "TVON" status to said micro processor; and said analog to digital converter coupled to said micro processor wherein said analog to digital converter converts said TV audio interface output and said $I^2C$ Interface output to a digital format;

said non volatile memory coupled to said micro processor wherein said non volatile memory stores said channel match signal status, said "TVON" status, and data used to calculate said channel match signal status and said "TVON" status.

14. The system of claim 13 wherein said coincidence processor further determines when said at least one audio output from said television matches said audio portion of said TV signal.

15. The system of claim 14 wherein said coincidence processor is further adapted to generate said channel match signal when a channel match has occurred and to reset said channel match signal at a predetermined time when said channel match has not recurred within a predetermined time.

16. The system of claim 15 wherein said micro processor is further adapted to generate an indication when a TV signal is detected.

17. A method of determining the channel of a TV signal to which a television is tuned when said television is in operation, said TV signal comprising a video signal portion and an audio signal portion, the method comprising the following steps:

(a) generating a channel match signal in response to a match between said video signal portion of said TV signal and a video sync signal of said television and also in response to a match between said audio signal portion of said TV signal and at least one audio output signal from said television, said channel match signal being generated without requiring insertion of an identifier signal into the TV signal broadcast;

(b) resetting said channel match signal at a predetermined time when said channel match has not recurred within a predetermined time.

18. The method of claim 17 wherein step (a) further comprises:

(a) generating said channel match signal in response to a match between said video signal portion of said TV signal and a video sync signal of said television;

(b) generating said channel match signal in response to the presence of an audio match between said audio signal portion of said TV signal and said at least one audio output signal from said television; and (c) generating said channel match signal in response to the presence of a video match between said video signal portion of said TV signal and a video sync signal of said television, and an audio match between said audio signal portion of said TV signal and said at least one audio output signal from said television.

* * * * *